A. M. POOLEY & F. W. VALLAT.
MOTOR CYCLE OR MOTOR ATTACHMENT FOR CYCLES.
APPLICATION FILED SEPT. 11, 1914.
1,177,210.
Patented Mar. 28, 1916.
2 SHEETS—SHEET 1.
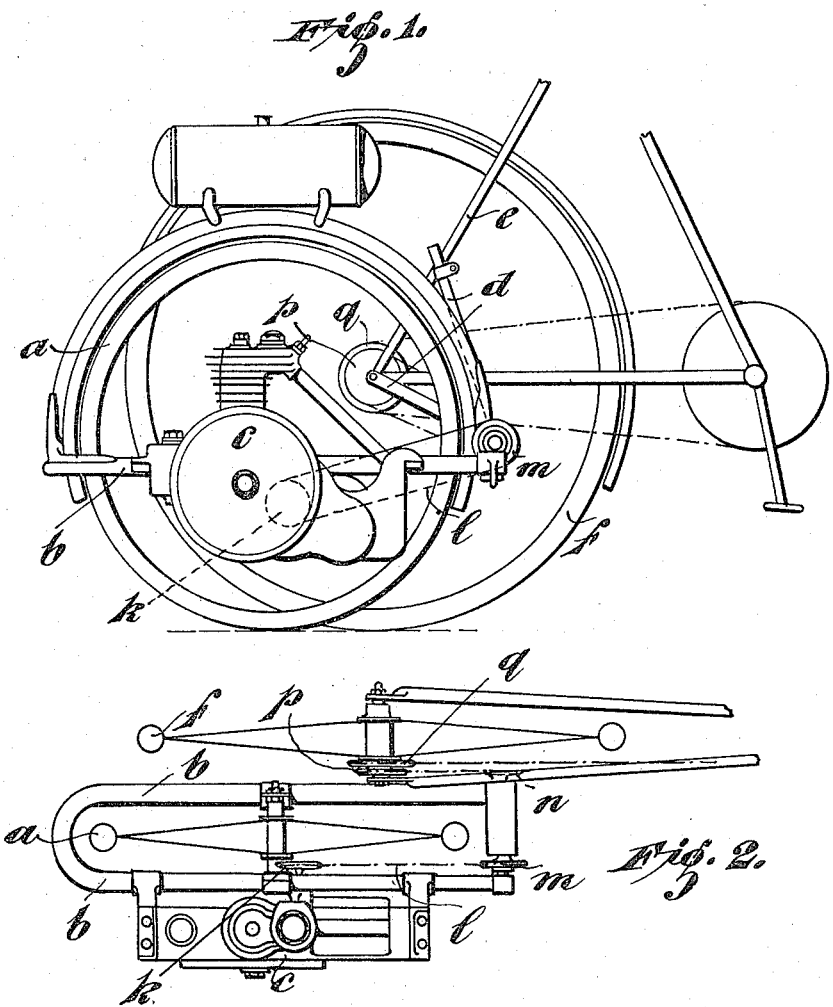
Inventors
A. M. POOLEY
F. W. VALLAT

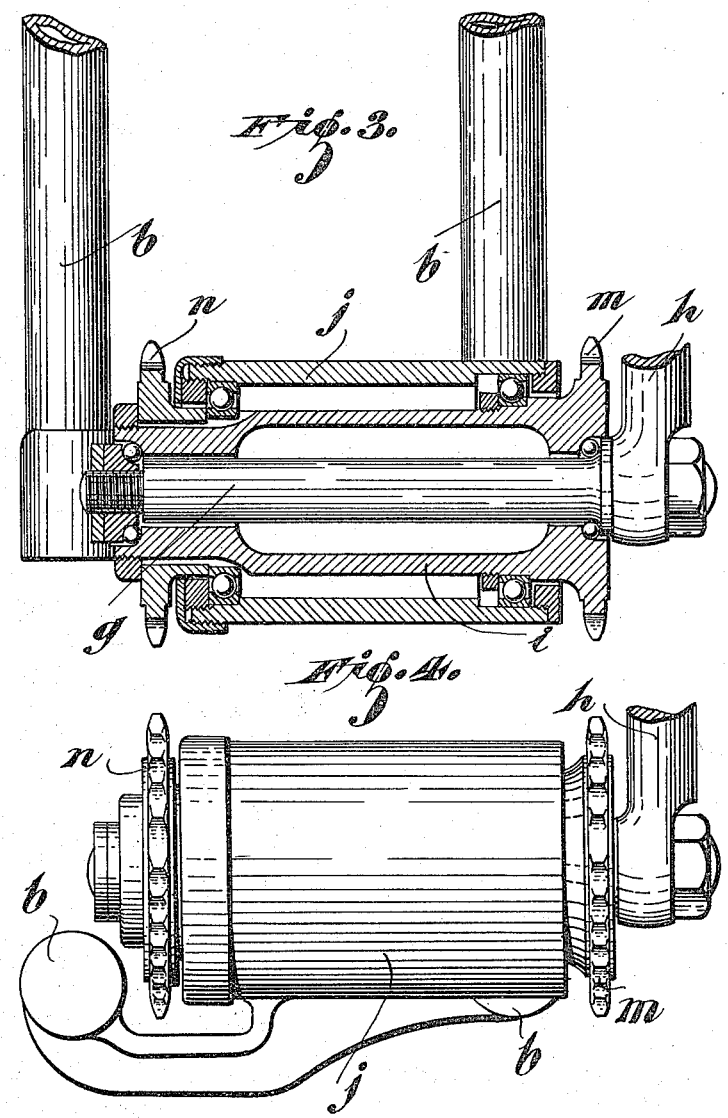

UNITED STATES PATENT OFFICE.

ARTHUR MILNES POOLEY AND FREDERICK WILLIAM VALLAT, OF LONDON, ENGLAND, ASSIGNORS TO AUTO WHEELS LIMITED, OF LONDON, ENGLAND, A CORPORATION OF GREAT BRITAIN.

MOTOR-CYCLE OR MOTOR ATTACHMENT FOR CYCLES.

1,177,210.

Specification of Letters Patent. Patented Mar. 28, 1916.

Application filed September 11, 1914. Serial No. 861,267.

*To all whom it may concern:*

Be it known that we, ARTHUR MILNES POOLEY, a subject of the Kingdom of Great Britain, residing at 85 Gresham street, London, in the county of Middlesex, England, and FREDERICK WILLIAM VALLAT, a subject of the Kingdom of Great Britain, residing at 26 Stonar road, W. Kensington, London, in the county of Middlesex, England, have invented a certain new or Improved Motor-Cycle or Motor Attachment for Cycles, of which the following is a specification.

This invention comprises a new or improved motor cycle or motor attachment for cycles.

According to the present invention we adapt for arrangement at, or substantially at, the side of a cycle, an auxiliary wheel carrying a motor adapted to drive a road wheel of the cycle, other than such auxiliary wheel, the auxiliary wheel being so adapted as to be capable of an up-and-down movement in relation to the cycle. Advantageously the auxiliary member is pivoted or is adapted to oscillate in the up-and-down movement, and it is advantageously so pivoted to the frame of the cycle that the auxiliary wheel is constrained to move in a plane of fixed position in relation to the main frame of the cycle, this plane being conveniently parallel with the plane of the rear wheel of the cycle and in close relationship thereto. A bicycle fitted with the present invention thus retains all its ordinary characteristics of a bicycle. Lateral inclination is permissible notwithstanding the positioning of the auxiliary wheel at the side of the bicycle, and the power transmission means are such that they are not interfered with by the up-and-down movement of the auxiliary wheel, the engine carried by which is enabled to efficiently transmit power to the road wheel of the vehicle throughout all the different positions of up-and-down movement or oscillatory movement of the auxiliary wheel. By reason of the provision permitting of movement of the auxiliary wheel in relation to the main wheel, vibration of the engine is not materially or appreciably experienced by the main wheel or frame of the cycle, any vibration existing being substantially confined to the oscillatory auxiliary member.

The motor carried by the auxiliary wheel may also be adapted to impart power to the auxiliary wheel and when the auxiliary wheel is of smaller diameter than the road wheel of the bicycle, the driving gears relating to the respective driven wheels are of such ratios that in the ordinary running of the bicycle the two wheels rotate appropriately to prevent slip or creep of either wheel in relation to the road surface. In an alternative arrangement the engine is adapted to drive the main and auxiliary wheels through the medium of a differential gear, whereby the power is imparted to the two wheels and both wheels enabled to act as driving wheels, both when running along the straight, and when negotiating curves or corners.

For the purpose of permitting of the arrangement of the auxiliary wheel as closely as necessary or desirable to the one side of the bicycle, the engine may be disposed on that side of the auxiliary wheel remote from the bicycle.

The attachment is advantageously of a character whereby it may be readily detached from the bicycle, and the latter driven by pedaling. When the attachment is in use the bicycle may be propelled entirely by motive power or entirely by pedaling, or partially by motive power, and partially by pedaling.

In order that this invention may be clearly understood and readily carried into practice, reference may be had to the appended explanatory sheet of drawings, upon which:—

Figure 1 is a part elevation of a bicycle having the present invention applied thereto. Fig. 2 is a plan of the parts shown in Fig. 1. Fig. 3 is a part sectional plan of the auxiliary member on an enlarged scale. Fig. 4 illustrates in elevation the parts shown in Fig. 3.

In a convenient embodiment of the present invention, the auxiliary wheel *a* is mounted in an auxiliary frame *b* upon which the driving motor *c* and its appurtenances are carried, and said auxiliary frame *b* is pivoted or swiveled to a part *d* carried by the frame *e* of the main bicycle whereby the auxiliary frame *b* with its auxiliary wheel *a* and motor *c* may oscillate in a plane parallel with the plane of the driving rear wheel *f* of the bicycle, the auxiliary wheel $a$ being to the one side of the rear wheel $f$ of the bicycle, and with the auxiliary frame $b$ swiveled at its forward end. At the point at which the auxiliary frame is swiveled to the main frame, a shaft or spindle $g$ is incorporated. This shaft or spindle $g$ is rigidly secured at its one extremity to a stay or member $d$ which is rigidly secured in any suitable manner to the cycle frame. Around the spindle $g$ and advantageously mounted upon same through the medium of ball bearings, a sleeve $i$ is provided. Said sleeve is in turn encircled by a second sleeve $j$, the sleeve $j$ being advantageously mounted upon the sleeve $i$ through the medium of ball bearings. The ball or other bearings are of a character whereby the sleeves $i$ and $j$ are restrained from axial derangement. To the sleeve $j$ are rigidly secured tubes or members forming the chassis $b$ of the auxiliary member. Upon the crank shaft or intermediate shaft of the engine $c$ is mounted a sprocket $k$ which is in gear through the medium of a chain $l$ with a sprocket wheel $m$ fixed upon the outer end of the sleeve $i$. Such sleeve $i$ carries a second sprocket wheel $n$ which is in gear through the medium of a chain $o$ with a sprocket wheel $p$ which is fixed, in addition to the ordinary pedal-driven sprocket $q$ upon the rear hub of the bicycle. The chassis is thus enabled to oscillate in relation to the sleeve $i$ the axis of oscillation of the chassis coinciding with the axis of rotation of the sleeve $i$ and the sleeve $i$ is thus enabled to transmit power from the engine to the road wheel of the cycle notwithstanding the varying positions which the auxiliary chassis may assume in relation to the main cycle frame.

If desired a third sprocket wheel may be mounted upon the sleeve $i$, said third sprocket wheel gearing with a sprocket wheel of suitable diameter on the hub of the auxiliary wheel $a$ whereby such auxiliary wheel is driven at an appropriate gear relationship to the main road wheel of the bicycle, or such auxiliary wheel may be driven by any suitable gear mechanism directly from the crank shaft of the engine. A differential gear is, if necessary or desirable incorporated in connection with the sleeve $i$ or in connection with the crank shaft, or at any other suitable point, said differential gear receiving motion from the engine crank shaft and imparting motion to the main driving wheel of the bicycle, and also to the auxiliary wheel by a motion whereby one wheel is enabled to advance in relation to the other while still appropriately receiving driving power from the sion mechanism involving bevel or worm gearing, in any or all of the power transmission mechanisms.

In connection with the sleeve $i$ or at any other suitable point, a clutch may be incorporated adapted for operation by hand or foot, whereby the driving connection between the motor and the rear driving wheel of the bicycle may be engaged or disengaged. A change speed gear may also if desired be incorporated and may be combined with the sleeve associated with the axis of movement of the auxiliary frame, or may be incorporated in any other suitable manner.

The oscillatory connection between the auxiliary frame and the main frame of the bicycle is advantageously of such a detachable character as to permit of the auxiliary frame being detached by the user who has also only to disconnect the driving chain between the auxiliary member and the main road wheel of the bicycle, after which the bicycle may be pedaled in the ordinary manner, or by disengaging the clutch, or by lifting the auxiliary wheel and retaining it out of contact with the ground, the bicycle may be pedaled as an ordinary bicycle without any material or appreciable impediment being presented by the presence of the auxiliary attachment.

What we claim as our invention and desire to secure by Letters Patent is:—

1. A motor cycle or motor attachment for a cycle, furnished with an auxiliary wheel carrying a motor adapted to drive a road wheel of the cycle other than such auxiliary wheel, said auxiliary wheel being adapted to occupy a position at, or substantially at, the side of the cycle, the auxiliary member carrying said auxiliary wheel being adapted to oscillate to permit of an up-and-down movement of such auxiliary wheel, and in which the power from the engine is transmitted by endless chain, belt or other suitable gearing to an intermediate member, the axis of which coincides with the axis of oscillation of the auxiliary member, and from which intermediate member the power is transmitted by endless chain, belt or other suitable gearing to the aforesaid road wheel of the cycle, substantially as set forth.

2. A motor cycle or motor attachment for a cycle, having an auxiliary wheel mounted in an oscillatory auxiliary member carrying an engine adapted to drive a road wheel of the cycle other than such auxiliary wheel, an intermediate member coinciding with the axis of oscillation of the auxiliary member, said intermediate member being adapted to receive motion from the engine and to transmit motion to the road wheel of the cycle, of the intermediate member, to which oscillatory member the auxiliary member is fixed or secured in such manner that the auxiliary wheel is adapted to oscillate in a plane parallel with, and in close relationship to, the plane of the main rear wheel of the cycle.

3. A motor cycle or motor attachment for a cycle, involving a pivot adapted to be fixed to the cycle frame, a sleeve rotatably mounted upon said pivot and adapted to impart motion to the road wheel of the cycle, a second sleeve encircling said first-mentioned sleeve and adapted to oscillate about an axis coinciding with the axis of the first mentioned sleeve, a chassis or auxiliary member fixed to said second sleeve, an auxiliary wheel carried by said chassis or auxiliary member and disposed in close relationship at the side of the rear wheel of the cycle, a motor mounted on said chassis or auxiliary member on the side of the auxiliary wheel remote from that on which the bicycle occurs, and means for transmitting power from said motor to the first mentioned sleeve member, substantially as set forth.

In witness whereof we have hereunto set our hands in the presence of two witnesses.

ARTHUR MILNES POOLEY.
FREDERICK WILLIAM VALLAT.

Witnesses:
JOSEPH EDWARD MOORES,
ARTHUR GEORGE GOBELL.

Copies of this patent may be obtained for five cents each, by addressing the "Commissioner of Patents, Washington, D. C."